United States Patent
Peters et al.

(10) Patent No.: US 10,118,243 B2
(45) Date of Patent: Nov. 6, 2018

(54) REAL TIME INDUCTANCE MONITORING IN WELDING AND CUTTING POWER SUPPLY

(71) Applicant: LINCOLN GLOBAL, INC., Santa Fe Springs, CA (US)

(72) Inventors: Steven R. Peters, Huntsburg, OH (US); William T. Matthews, Chesterland, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 0 days.

(21) Appl. No.: 15/782,918

(22) Filed: Oct. 13, 2017

(65) Prior Publication Data

US 2018/0036824 A1 Feb. 8, 2018

Related U.S. Application Data

(63) Continuation-in-part of application No. 14/790,723, filed on Jul. 2, 2015, which is a continuation of application No. 13/273,859, filed on Oct. 14, 2011, now Pat. No. 9,095,921.

(51) Int. Cl.
| | |
|---|---|
| *B23K 9/10* | (2006.01) |
| *B23K 33/00* | (2006.01) |
| *B23K 9/32* | (2006.01) |
| *B23K 9/095* | (2006.01) |

(52) U.S. Cl.
CPC .......... *B23K 9/1062* (2013.01); *B23K 9/0953* (2013.01); *B23K 9/1006* (2013.01); *B23K 9/1056* (2013.01); *B23K 9/32* (2013.01)

(58) Field of Classification Search
CPC ........ B23K 9/0738; B23K 9/09; B23K 9/092; B23K 9/06; B23K 9/091
USPC ........................ 219/136–137 PS, 129–130.51
See application file for complete search history.

(56) References Cited

U.S. PATENT DOCUMENTS

| | | | |
|---|---|---|---|
| 4,546,234 A | 10/1985 | Ogasawara et al. | |
| 4,721,947 A | 1/1988 | Brown | |
| 4,954,691 A | 9/1990 | Parks | |
| 5,043,557 A | 8/1991 | Tabata | |
| 5,571,431 A | 11/1996 | Lantieri et al. | |
| 5,734,147 A * | 3/1998 | Bunker | B23K 9/1006 |
| | | | 219/130.33 |
| 6,710,297 B1 | 3/2004 | Artelsmair et al. | |
| 6,849,828 B2 * | 2/2005 | Aigner | H02M 7/5236 |
| | | | 219/130.21 |

(Continued)

FOREIGN PATENT DOCUMENTS

| | | |
|---|---|---|
| EP | 1027951 A1 | 8/2000 |
| JP | 53-2426 | 1/1978 |

(Continued)

OTHER PUBLICATIONS

International Search Report dated Feb. 2, 2013.

*Primary Examiner* — Sang Y Paik
(74) *Attorney, Agent, or Firm* — Perkins Coie LLP (57) ABSTRACT

A system and method is provided for monitoring and displaying real time information regarding the inductance of the welding circuit, such that a user can monitor the performance of a power supply to determine if the system inductance is adversely affecting the operation of the power supply, and where the system can change the output signal based on the detected system inductance.

26 Claims, 7 Drawing Sheets

(56) References Cited

U.S. PATENT DOCUMENTS

| | | | |
|---|---|---|---|
| 6,995,338 B2 * | 2/2006 | Hutchison | B23K 9/1062 |
| | | | 219/130.21 |
| 7,072,774 B1 | 7/2006 | Houston | |
| 9,095,921 B2 | 8/2015 | Peters | |
| 2004/0069759 A1 * | 4/2004 | Davidson | B23K 9/091 |
| | | | 219/130.5 |
| 2010/0308027 A1 * | 12/2010 | Vogel | B23K 9/0953 |
| | | | 219/130.21 |

FOREIGN PATENT DOCUMENTS

| | | |
|---|---|---|
| JP | 53-51425 | 5/1978 |
| JP | 58-71466 | 5/1983 |
| JP | 60-068164 | 4/1985 |
| JP | 60-068165 | 4/1985 |
| JP | 61-111770 | 5/1986 |
| JP | 64-75176 | 3/1989 |
| JP | 64-075176 | 3/1989 |
| JP | 2001276971 A | 11/1996 |
| JP | 09-262670 | 7/1997 |
| JP | 2001-030072 | 2/2001 |
| JP | 2001-212669 | 7/2001 |
| WO | 2007132362 A2 | 11/2007 |
| WO | 2008140398 A1 | 11/2008 |
| WO | 2010141435 A2 | 12/2010 |
| WO | 2013054182 | 4/2013 |
| WO | 2013054182 A1 | 4/2013 |

* cited by examiner

REAL TIME INDUCTANCE MONITORING IN WELDING AND CUTTING POWER SUPPLY

PRIORITY

The present application is a continuation in part of U.S. application Ser. No. 14/790,723 filed on Jul. 2, 2015, which is a continuation of U.S. application Ser. No. 13/273,859, filed on Oct. 14, 2011, which is now U.S. Pat. No. 9,095,921, the entire disclosures of which are incorporated herein by reference.

BACKGROUND OF THE INVENTION

Field of the Invention

Methods and systems consistent with the present invention relate to welding and cutting power supplies, and more specifically relate to welding and cutting supplies which can monitor their inductance.

Description of the Related Art

As the technology in welding and cutting power supplies has advance the power supplies have been able to perform more complex welding, which often requires complex welding waveforms, including high current and voltage ramp rates. However, because of the nature of power supplies and the welding operation a significant amount of inductance can be present in the welding circuit, which can come from the power supply itself, the workpiece and the welding cables. Power supplies have been developed which are capable of controlling or dealing with the inductance inherent in the power supply. However, because the power supply is not always positioned close to a welding operation, the inductance created because of long welding cables and from the workpiece is more difficult to deal with. When the welding cables become too long, this inductance can compromise the operation of the power supply, or limit its performance.

BRIEF SUMMARY OF THE INVENTION

Embodiments of the invention include a welding or cutting power supply having a first and second output terminal, a power component module coupled to each of the first and second output terminals which outputs an output signal through the first and second terminals. A positive lead is coupled to the first terminal and a second lead is coupled to the second terminal. There is also a voltage detection circuit which detects an output voltage across the first and second output terminals during a welding or cutting operation, and a comparator circuit which compares the detected voltage to a threshold voltage. A user display is included which displays a result of the comparison between the detected voltage and the threshold voltage for a user of the power supply.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

Figure 1:
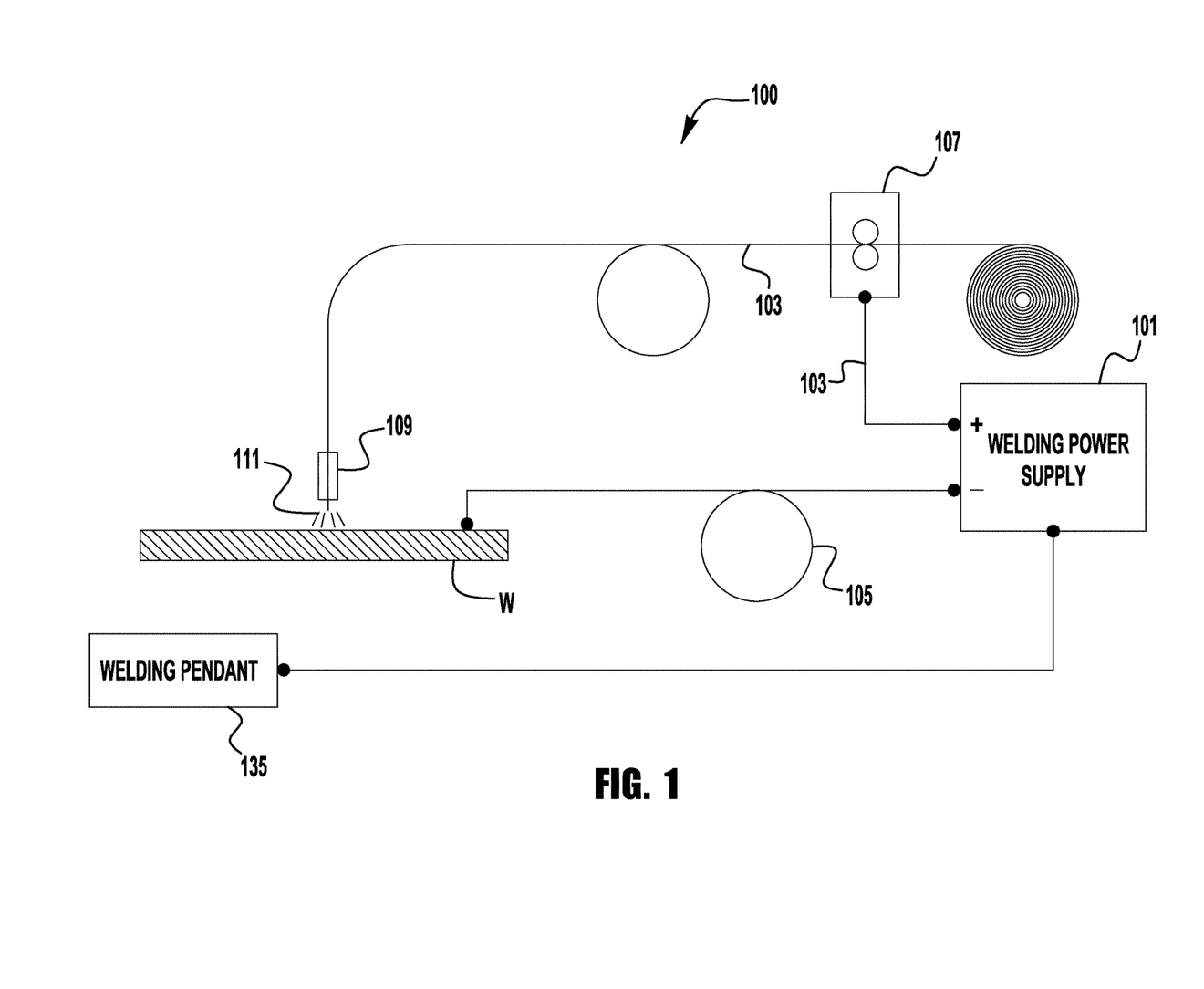
FIG. 1 is a diagrammatical representation of a welding system in accordance with an exemplary embodiment of the present invention.

FIG. 1 depicts an exemplary embodiment of a welding system 100 of the present invention. The system 100 shown in this figure is a welding system. However, embodiments of the present invention are not limited to a welding system and can also be a cutting system (such as a plasma cutting system) as well. Throughout this specification the term "welding system" may be used, but its use is intended to simply the discussion and it should be understood that embodiments of the present invention can also be used in cutting systems, which have a similar structure and operation to that of a welding system.

The welding system 100, which can be an arc welding system, contains a power supply 101 which provides a welding signal through the welding leads 103 and 105 to a work piece W. The welding signal has a current and a voltage, and can be any type of welding signal that requires a change in current from one level to another. For example, the signal can be a pulse welding signal which changes from a background to a peak level during welding, or an alternating polarity waveform that changes from one polarity to the other at a known rate. The current from the power supply 101 is delivered to an electrode 111 via a contact tip 109 to generate an arc between the electrode 111 and the work piece. As is common in welding systems the positive lead 103 is coupled to a wire feeding device 107 which then passes the welding current through a welding cable to the contact tip 109. In such a configuration the overall length of the positive lead 103 is a combination of the connection from the power supply 101 to the wire feeder 107 and from the wire feeder 107 to the contact tip 101. Of course the lead 103 can be coupled directly to the contact tip 109. Further, although the present discussion and figures are generally related to, and depict, a gas metal arc welding (GMAW) process, this depiction and discussion is intended to be only exemplary. Embodiments of the present invention can be implemented in welding systems which perform various types of welding operations, including but not limited to: FCAW, SAW, TIG, etc., and can be used in plasma cutting systems. Further, in addition to welding, embodiments of the present invention can be implemented and used in systems used for additive manufacturing, hardfacing, cladding, material build up and repair/reconditioning without departing from the spirit or scope of the present invention. As used herein, the term "welding" is intended to encompass all of these technologies as they all involve material deposition to either join or build up a work piece. Therefore, in the interests of efficiency, the term "welding" is used below in the description of exemplary embodiments, but is intended to include all of these material deposition operations, whether or not joining of multiple workpieces occurs.

In FIG. 1, the welding leads 103 and 105 are depicted to be quite long as the work piece W can be positioned far away from the power supply. For example, in some industrial applications the leads 103/105 can have a length off at least 100 feet. Such long lengths can significantly increase the inductance of a welding circuit.

The power supply 101, like all welding (and cutting) power supplies, has an upper current and voltage output limit based on its inherent design. This limitation may be part of the hardware design of the power source or may be part of a protection circuit in the power source's control system. Of course, this limit will vary depending on the type, design and size of the power supply, but each power supply has output limits. When the power demanded by the welding or cutting process is pushed above the limits of the power source 101, the actual welding/cutting output will be limited and the welding/cutting characteristics will suffer.

Many modern welding processes are defined by two or more current levels with defined ramp rates to transition between the current levels. For example, in pulse welding, there is a defined high peak current level and a defined lower background level along with a ramp up rate and ramp down rate that defines how fast the current will change between these levels. For a second example, in a variable polarity system there is a positive current level and a negative current level along with a defined ramp rate to transition between the two polarities.

In many applications, due to a number of reasons, the power source must be located a distance from the actual point of work. Long electrode cables 103/105 are used to transfer current from the power source to the work W and wire feeder 107. When these electrode leads 103/105 become longer they can add inductance to the overall welding circuit. This added inductance can cause a peak in the output voltage as the current is ramping up, and this voltage peak often occurs just before the current levels out at the desired peak current output. This voltage spike can be referred to as reflected voltage as it is essentially a product of the change of current reflected back to the power supply 101 because of the circuit inductance. Thus, the reflected voltage is essentially the voltage seen at the output studs of the machine during welding, which is a result of the welding system inductance. With the added inductance from long welding leads, this reflected voltage can cause the output voltage to reach or exceed the desired or designed voltage output threshold of the power supply 101. This reflected voltage or voltage peak can be further understood when considering that $Volt.=(L\times(di/dt)+I\times R_{(cables+arc)}$, where L is the inductance of the welding cables, di/dt is the current ramp rate (amps/ms), R is the combined resistance of the arc and the welding cables and I is the current. Fast ramp rates (large di/dt) forced into welding circuits with long welding cables (large L) produce high voltage spikes. This is especially noticeable when high peak currents (large I) are required. The additive affect of high inductance and high current amplifies the voltage observed. In the above stated equation, the rate of change of current (di/dt) and the current (I) are both defined by the welding characteristic or mode used. Different weld modes define different ramp rates and different current levels. The inductance (L) and the resistance (R) are part of the welding circuit being used. Depending on the weld mode used, (defining the ramp rate and current levels) the inductance and resistance in the welding circuit may or may not place the output voltage above the design limits of the power source.

A few modern power supplies are capable of running a diagnostic test to determine the inherent inductance and resistance of the welding system. However, these tests are static tests and not designed to monitor the real-time welding circuit inductance during welding (or cutting) to allow a user to monitor how the system inductance is affecting system performance. Depending on the active weld mode being used, the actual ramp rates and current levels required, static tests report little about the actual operating conditions being overcome. Exemplary embodiments of the present invention provide such inductance monitoring and feedback.

Figure 2:
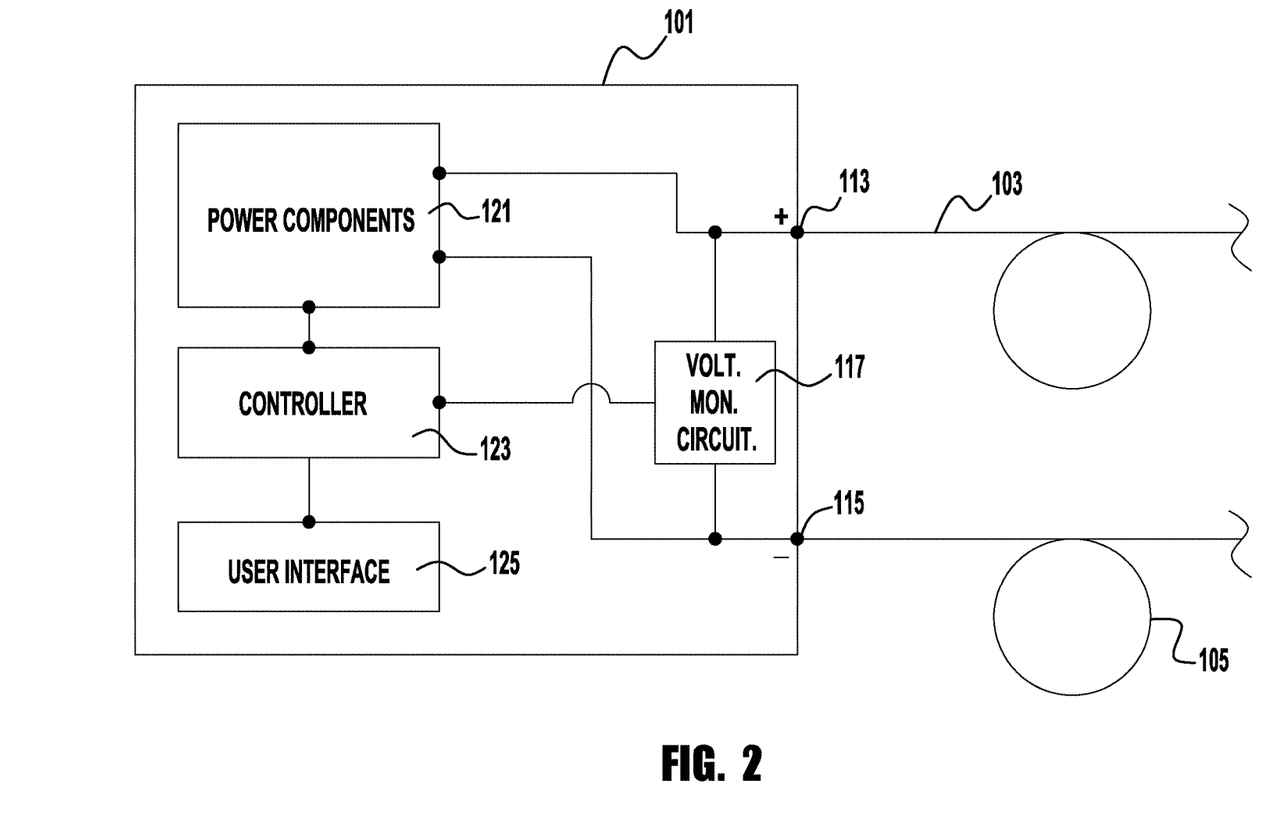
FIG. 2 is a diagrammatical representation of a power supply in accordance with an exemplary embodiment of the present invention.

As shown in FIG. 2, the power supply 101 has a real time voltage monitoring circuit 117, which monitors the output voltage of the power supply 101 across its positive and negative terminals 113/115. In exemplary embodiments of the present invention, this monitoring circuit 117 will not be the same circuit used to otherwise monitor the arc voltage of the welding or cutting process. Alternatively, an existing voltage monitoring circuit in the power supply can be used, however, the circuit must be one that monitors the inductance of the entire welding/cutting circuit. This way the voltage detected will take into account the influence of the welding cables.

In some exemplary embodiments, the voltage monitoring circuit 117 monitors the output voltage at all times, while in other embodiments the circuit 117 only monitors the voltage during the transition of current from a background level to a peak level, for example during the beginning of a welding pulse. In yet other exemplary embodiments, the voltage monitoring circuit 117 only monitors the voltage when the current ramp rate (di/dt) exceeds a threshold value. For example, for a given power supply 101 when the current ramp rate is below a threshold value the inductance of the welding circuit is not as critical and therefore need not be monitored. Whereas, if the ramp rate is above the threshold then monitoring the inductance is more important. In some exemplary embodiments, the ramp rate threshold is predetermined and a function of the construction of the power supply, while in other embodiments the ramp rate threshold is a function of the welding operation being performed and this can vary depending on the welding being performed.

The power supply 101 contains a controller circuit 123 which generally controls the operation of the power supply 101, including the output power components 121, which provide the output power. The output power components 121 can have any known construction, and can be that of a transformer or inverter-type power supply. The present invention is not limited in this regard. The controller 123 can have a memory which contains the predetermined ramp rate threshold for the power supply 101 or can have a look-up table, or similar means, to determine a ramp rate threshold based on user input for a welding operation. In some exemplary embodiments of the present invention, the ramp rate threshold is at or above 400 a/ms. In another exemplary embodiment, the ramp rate threshold is at or above 250 a/ms. Of course, in other embodiments the ramp rate threshold is not employed and the system is constantly monitoring the system inductance so as to provide the needed feedback.

It should also be understood that the ramp rate discussion set forth above is not limited to a positive ramp rate in which the current is increasing from a low positive polarity and is increasing to a higher positive current, but is also intended to included ramp rates where current is proceeding from a one peak current to another peak current, as in AC welding waveforms and variable polarity waveforms, and includes negative slopes. That is, the ramp rate values discussed above are absolute values of the ramp rate.

The controller 123 also contains the voltage output threshold for the power supply 101. This threshold is typically predetermined and is a function of the construction of the power supply 101. Thus, in exemplary embodiments this output voltage threshold will be a preprogrammed value by the manufacturer of the power supply. The threshold voltage can be determined based on many different parameters but is essentially a voltage level that it is desirable not to exceed during operation as it can adversely affect the performance or operation of the power supply. During operation, the controller 123 (or a similar circuit) compares the voltage detected from the circuit 117 and based on that comparison informs a user (through a user interface 125) of the system inductance so that the user can make a determination regarding welding operation. This will be discussed in more detail below. As stated above, this voltage comparison can be performed during the entire welding operation, or can just occur during discrete portions of the welding process, e.g., either when the current ramp rate exceeds a threshold or when the current is increasing from a background to a peak level, or when the polarity changes in a variable polarity system. In some exemplary embodiments, the voltage comparison data is recorded in a memory device in the controller 123 such that a user can review the inductance data at some time after the welding operation. In exemplary embodiments of the present invention, the sampling/detection rate of the voltage is at least 10 KHz. In other exemplary embodiments, the detection/sampling rate is in the range of 100 to 200 KHz.

In other exemplary embodiments the voltage comparison can be done by a comparator circuit outside of the controller 123, where the comparison result is then communicated to the controller 123.

Figure 3:
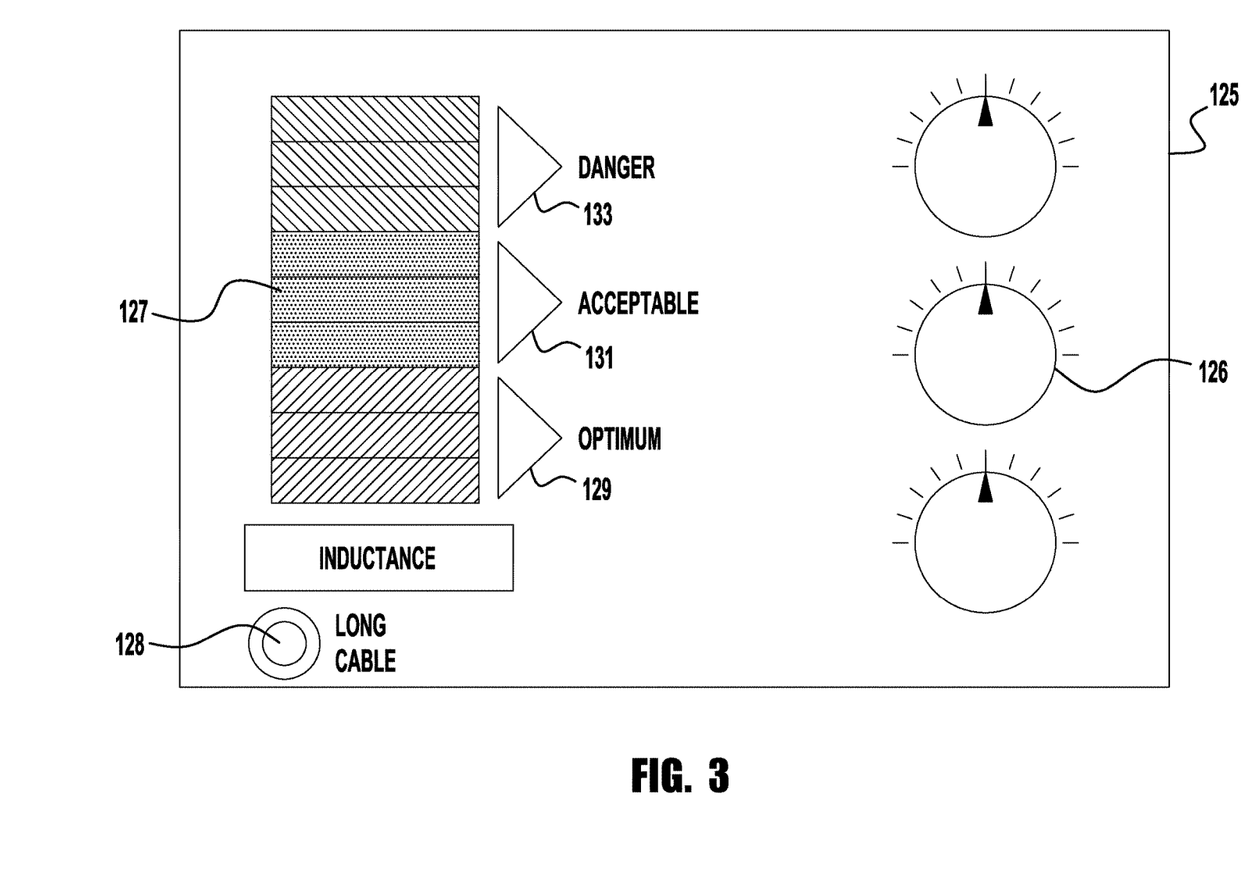
FIG. 3 is a diagrammatical representation of a user interface in accordance with an exemplary embodiment of the present invention.

FIG. 3 depicts an exemplary user interface 125 for the power supply 101. The user interface 125 typically contains a plurality of welding input controls 126, which can include wire feed speed, voltage, current, etc. These controls are typical and embodiments of the present invention are not limited in this regard. The exemplary user interface 125 also has an inductance display 127 which displays information regarding the system inductance which would allow a user to monitor system performance and determine if a change should be made—like a change in the length of the cables 103/105. The inductance display 127 is coupled to the controller 123 such that the voltage comparison data from the controller can be displayed on the display 127. In exemplary embodiments of the present invention, the display 127 has at least one user warning indicator. Thus, when the detected peak voltage reaches or exceeds a user warning level a warning indication is displayed in the display 127 to show the user that the inductance of the welding circuit is causing the power supply to approach or exceed a system threshold.

In the exemplary embodiment shown in FIG. 3, the display 127 has a plurality of indication levels which provide a user with relative data regarding the performance of the power supply 101. As shown in FIG. 3 the display 127 has three indication levels. They are: OPTIMUM 129, ACCEPTABLE 131, and DANGER 133. Further, each of the indication levels are divided into further indication levels. Of course, the depiction in FIG. 3 is intended to be exemplary and embodiments of the present invention are not limited to this indication mechanism.

In FIG. 3, each of the indication levels 129, 131, and 133 have a distinct identifier, which can be color, pattern, etc. For example, the OPTIMUM level can use a green color, the ACCEPTABLE level can use a yellow color, and the DANGER level can use a red color in the display 127. This will allow a user to easily determine the performance of the power supply 101.

During welding, the controller 123 compares the voltage from the circuit 117 to a threshold voltage and based on that comparison will illuminate the appropriate region in the display. Thus, if the output voltage is in a first percentage range of the threshold value a first region will be illuminated, if the detected voltage is in a second percentage range of the threshold voltage a second region will be illuminated and if the output voltage is above the second percentage range a third region will be illuminated. In an exemplary embodiment of the present invention, if the detected voltage is at or below 75% of the threshold voltage the controller 123 will cause the first region 129 on the display 127 to be illuminated. The number of bars illuminated in the region 129 will be a function of the determined percentage difference. That is, if the detected difference is close to 75% then all three bars in the region 129 will be illuminated. Further, if the detected difference is in the range of 75 to 95% of the threshold then at least some the bars in the region 131 will be illuminated. Finally, if the voltage is above 95% of the threshold then at least some of the bars in the region 133 will be illuminated. This will provide the user with a clear indication of how the system inductance is affecting the welding operation.

In other exemplary embodiments it is not necessary to use a percentage comparison, but other means of comparison can be used. For example, rather than a having a single threshold value stored in the controller 123, the controller 123 can simply have/determine a number of threshold voltage values. The operation would be similar to that described above except that rather than using a percentage of the threshold value to determine the proper indication on the display 127, the controller will compare the detected voltage to the determined/programmed voltage levels and make the appropriate display. For example, the controller will illuminate the region 129 when the voltage is less than 45 volts, illuminate the region 131 when the output is in the range of 45 to 55 volts and illuminate the region 133 when the voltage is above 55 volts. It is envisioned that these voltage ranges are based on the capability of the power source. This is because another power source running the same waveform, but having different capabilities with the associated operational range, may not have performance issues. For example, as compared to the example above, another power source may have voltage levels of up to 53 volts, within the range of 53 to 62 volts, and above 62 volts, for the various thresholds. Other alternatives can be used without departing from the scope or spirit of the present application.

In some exemplary embodiments, the user interface 127 can have an inductance monitoring switch 128. This switch will allow the user to turn on or off the monitoring function. For example, if the cables 103/105 are of a short length, the user may then not be concerned with inductance monitoring and can disable the feature. Similar, if the user is using cables 103/105 which are longer than normal then the user can turn on the monitoring to determine if the welding operation is within normal operating limits.

In other exemplary embodiments the controller 123 can have an emergency shut-off threshold, where if the detected voltage is above a certain maximum acceptable threshold the controller 123 will cause the power components 121 to shut down and stop providing an output.

In other exemplary embodiments, a display device 127 can additionally or alternatively provided on a wire feeder device 107 or on a welding gun holding the contact tip 109 (not shown). Because the user will likely be remotely positioned during welding operations, having a display 127 on either of the welding gun or wire feeder 107 will allow the user to monitor inductance while being remote from the power supply. Alternatively a similar display 127 can be placed on a welding pendant 135 (see FIG. 1). The use of welding pendants 135 are known in the welding industry to allow for the remote operation of welding power supplies and/or wire feeders. Thus, a pendant 135 can have the display 127 to allow the user to monitor inductance while welding remotely from the power supply. The pendant 135 can be coupled to either the power supply via wired or wireless connection.

Therefore, embodiments of the present invention monitor the peak voltage reached during welding to determine if the peak voltages are at or near a capacity level of the power supply 101. This information is then communicated to the user via a display 127, or similar means, to allow the user to adjust the welding system configuration (e.g., shorten the welding cables) to ensure acceptable power supply performance.

Figure 4A:
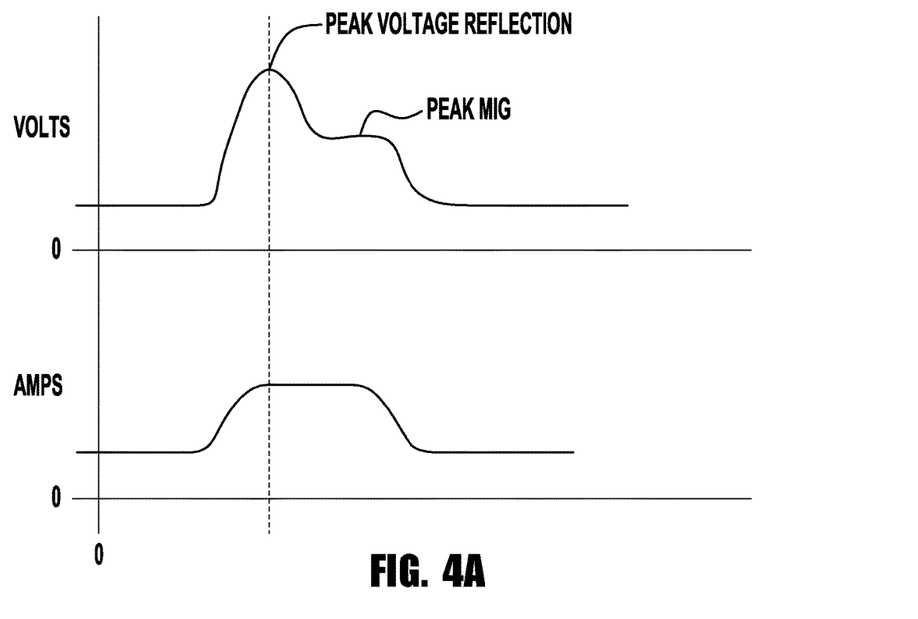
FIGS. 4A and 4B are diagrammatical representations of voltage and current waveforms.
Figure 4B:
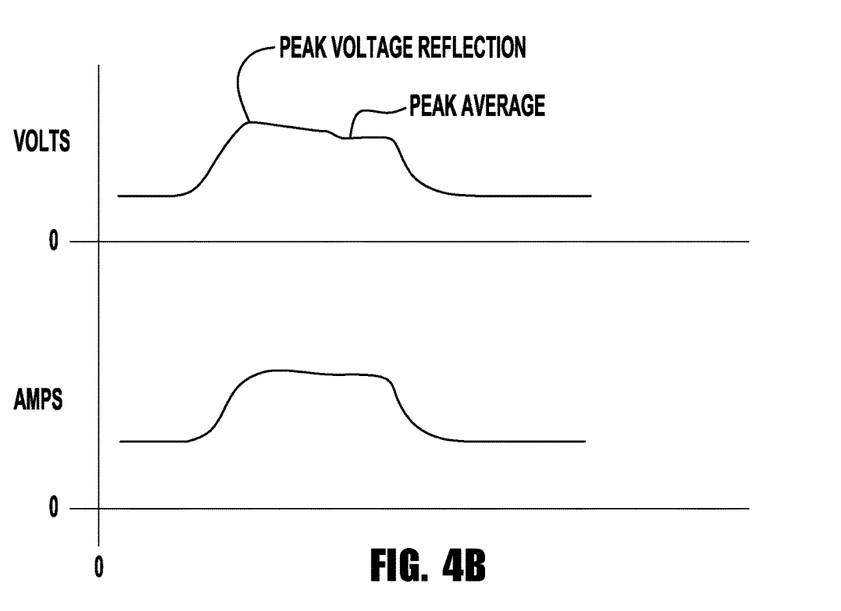

FIGS. 4A and 4B depict the voltage and current of a representative DC welding pulse waveform in a high inductance and low inductance welding circuit, respectively. The waveform In FIG. 4A the system is using long welding cables 103/105. As can be seen, as the current ramps from a background level to a peak level, the peak voltage reflection is considerably higher than the average peak voltage. This voltage spike can be close to the operational limits of the power supply 101 as described above. This is especially true if the average peak voltage is set near the operational limits of the power supply 101. However, in FIG. 4B a similar current pulse is shown having a similar ramp rate to that shown in FIG. 4A. However, because the system inductance is lower (shorter cables) the peak voltage reflection is considerable less and much closer to the average peak voltage. In this case the power supply 101 is operating well within its operational limits. It should be noted that the waveforms shown in FIGS. 4A and 4B are DC welding waveforms, but are only shown for exemplary purposes. As stated previously, embodiments can be used in any welding system which welds with waveforms having a current ramp rate which can cause the inductance issues described herein. For example, the welding waveforms can be AC, variable polarity, pulse, etc. These waveforms are understood by those of ordinary skill in the art, as is their use, implementation output from a power supply.

In further exemplary embodiment of the present invention, the above described inductance monitoring can be used to optimize the performance of a welding power supply and/or welding operation based on the detected inductance. As is generally understood, many current welding operations use high performance welding waveforms with high current ramp rates, both positive and negative current ramp rates. The use of these types of waveforms can be compromised if the system inductance is too high. Thus, embodiments of the present invention utilize the detected inductance to optimize the welding waveform in real time, or prior to commencement of the welding operation.

Figure 5A:
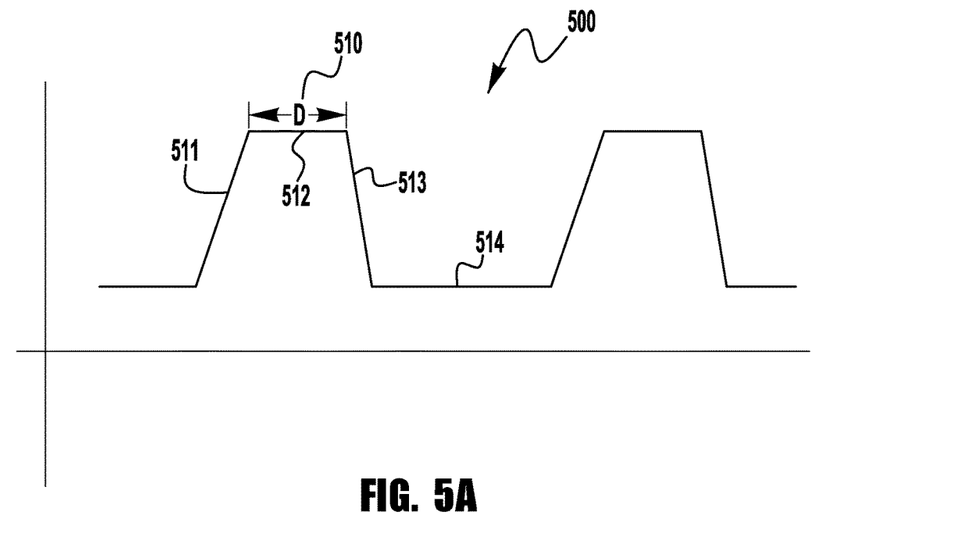
FIGS. 5A and 5B are diagrammatical representations exemplary current waveforms.
Figure 5B:
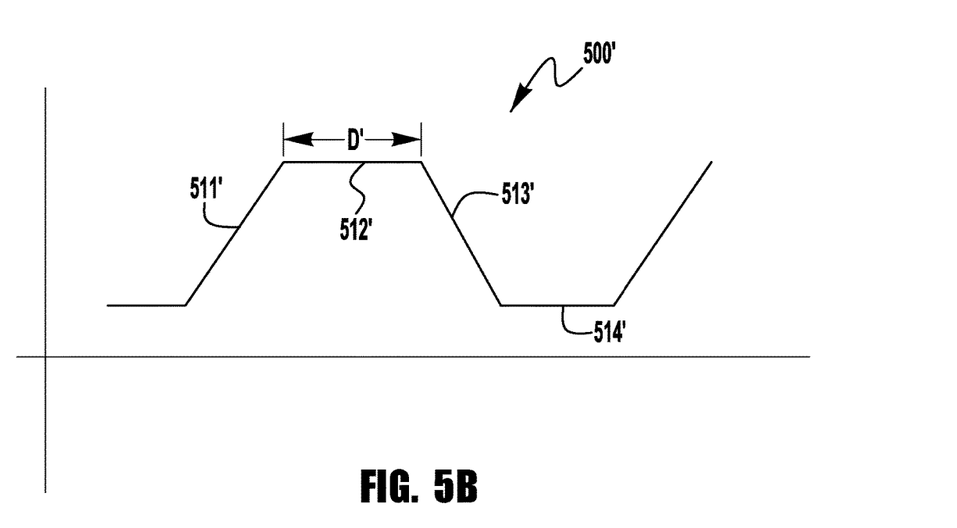

In some exemplary embodiments the controller 123 of the power supply can modify a selected waveform based on the detected inductance to optimize performance of the waveform. This is generally depicted in FIGS. 5A and 5B. In FIG. 5A a basic exemplary pulse welding waveform 500 is shown having a plurality of pulses 510. Each pulse has a first current increasing ramp rate (i.e. current slope) 511, a peak 512 with a duration D, a tail out or ramp down rate 513 and a background current 514. For purposes of this discussion this waveform 500 is a high performance waveform that uses high ramp rates for the current. It is generally known, that in many welding operations having a pulse profile which is nearly rectangular can be ideal as very high speed current changes can allow for more control and precision in a welding operation. These high performance waveforms can be achieved when the system inductance is low, thus allowing for rapid responsiveness for the welding current. However, in those instances where the system has high inductance, as detected by the controller 123, in embodiments of the present invention, the controller 123 modifies the welding waveform to achieve optimal performance based on the detected inductance level. As described above, this change to the desired waveform can occur prior to or during a given welding operation.

FIG. 5B depicts an exemplary waveform 500' after it has been modified by the controller 123 based on system inductance. In exemplary embodiments of the present invention, the controller 123 can modify/change any one or combination of the current ramp up rate 511', peak current level 512', the peak current duration D', the current tail out rate 513', the background current level 513', and/or the frequency of the waveform. The controller 123 selects the parameters to modify to achieve a waveform performance most similar to that of the desired waveform. Furthermore, in exemplary embodiments, the controller 123 will select the number/quantity of waveform parameters to change based on the detected inductance. This will be described more fully below.

In exemplary embodiments of the present invention, the controller 123 can determine a total amount of desired energy to be input via a given desired welding waveform. However, in those situations where a system inductance is too high, it may not be possible to achieve the desired energy input without waveform modifications. Thus, in exemplary embodiments, the controller 123 can determine that the desired ramp rate exceeds, or is near, the system capability due to the system inductance. With this determination, the controller 123 can modify the ramp rate of the welding waveform to a rate that can be achieved with the detected system inductance. For example, as shown in FIG. 5B the new ramp rate 511' is lower than that of the desired ramp rate 511. In some exemplary embodiments, this lower ramp rate is selected to be the optimal ramp rate that can be used for a given welding operation and the detected inductance. Further, in some exemplary embodiments, because the lower ramp rate can affect the total amount of energy put into the welding operation, i.e. lower it, the controller 123 can change some of the other waveform attributes to ensure that the total energy input by the welding operation is unchanged. For example, the controller can increase either one of, or both of, the peak current level 512 (to 512') or the peak duration D (to D'). These changes will ensure that a desired energy input is maintained. In other exemplary embodiments, the controller 123 can also increase the background current level and/or the frequency of the welding operation. In some exemplary embodiments, the number and magnitude of the changes to the waveform could be a function of the detected inductance and/or a function of the determined energy loss due to the ramp rate 511' change.

That is, in some exemplary embodiments, if the amount of energy loss is determined to be at or above a first threshold the controller will only change the ramp rate 511' and either or both of the peak current and peak duration, whereas if the energy loss is determined to be at or above a second threshold the controller 123 will also cause changes to the background current and/or frequency. This is done by the controller 123 to maintain a constant energy input from the weld due to the ramp rate change from the desired waveform 500 to the new waveform 500'. For example, in some exemplary embodiments as the inductance of the system increases the waveform frequency can be decreased to add stability and control in the welding process.

The controller 123 can use a look up table, or the like to make the appropriate changes to a waveform to maintain a desired energy input. Further, in some embodiments, the controller 123 recognizes limitations to changing a given waveform and if the required changes to the waveform result in a compromise in performance the controller 123 can prevent the welding operation from proceeding and/or provide an indication to the user similar to that described above. For example, for any given welding waveform, the controller 123 can have pre-programmed or predetermined limitations on the changes that can be made due to inductance of the system. Thus, in such systems, if the required changes to the waveform, to maintain an energy level, exceed the acceptable changes to the waveform, the controller 123 will not allow the welding operation to proceed, and/or can provide an indication to the user that the welding operation can be compromised.

In addition to changing the ramp rate 511', the controller 123 can change the tail out or ramp down rate 513' of the welding waveform based on the detected inductance. In many welding applications it is desirable to tail out as rapidly as possible, for example to reduce from a peak current to a background current. However, In many applications, during a tail out portion, when high inductance is present, the freewheeling current decay may be slower than the defined/desired tail out speed. In response, in many known systems the controller turns off the inverter, in an effort to speed up the tail out. However, in waveforms where the desired background current level is relatively low (e.g., 30 to 50 amps) the system controller does not know when to turn the inverter back on and often can overshoot the desired background level. When this happens the arc can go out, requiring and arc re-light process—which often requires the electrode to have contact with the puddle. Thus, in exemplary embodiments of the present invention, based on the detected inductance the controller can determine that a change in the tail out slope of a waveform is needed, similar to a change in the ramp up slope. In such embodiments, the system components, such as an output inverter is operated within the inductance limitations of the system. Further, in other exemplary embodiments, the controller 123 can change the welding operation to ensure that the output current is not turned off during tail out. For example, the controller 123 can ensure that the inverter is never turned off during tailout—as an example, in embodiments where the detected inductance is over a certain threshold the controller can ensure the inverter (or other similar welding output component) does not turn off during tail out. This will enable a more rapid response. In other exemplary embodiments, to the extent the output current is needed to be turned off during a given welding operation to achieved a desired performance, the controller 123 can change/determine when the output current needs to be turned back on, based on the detected system inductance, to ensure that the arc is not extinguished. That is, the controller can change the timing of the current turning off and turning back on to achieve a desired tail out rate without extinguishing the arc.

In other exemplary embodiments, because of the detected inductance, the controller 123 can change attributes of a welding starting pulse to achieve an optimum start based on the detected system inductance. For example, in some exemplary welding operations it may be necessary to start an arc as quickly as possible. In systems with a high inductance this may be difficult to achieve as the maximum ramp rate can be limited. Thus, in exemplary embodiments, to the extent the controller 123 detects an inductance level that is high, or otherwise over a threshold level, the controller 123 can increase the peak current level and peak current duration of a starting pulse and/or slow or stop the wire feed speed of a consumable during the start of the welding process. By stopping/slowing down the wire feed speed at the beginning of the welding process the arc can be generated quicker, which will aid in achieving a quick start to the welding operation.

In further exemplary embodiments, a short circuit clearing function can be changed/modified by the controller 123 based on the detected inductance. For example, for a given welding operation, assuming a normal or low level of inductance, a first short clearing function can be used, but if the detected inductance is at or exceeds a threshold level the short clearing function is changed to compensate for the increased inductance. For example, in surface tension transfer (STT) waveforms known systems will use a dv/dt detection threshold to detect or predict a shorting event. In embodiments of the present invention, the controller 123 will use a first dv/dt level to detect a shorting event when the system inductance is below a threshold level, but will use a second dv/dt level to detect a shorting event when the induction is at or above a threshold level. In exemplary embodiments, the second dv/dt level is lower than the first dv/dt level. In other exemplary embodiments, the shorting function/routine used for the welding operation can use a voltage threshold level to determine the presence of a short and this voltage level can be changed based on the detected inductance. For example, in some welding operations a detected voltage at a first level (e.g. 20 volts) can indicate the presence of, or clearing of, a short. However, in welding operations with high inductance a reflected voltage may reach that first level without the presence/clearing of a short. Thus, in exemplary embodiments a second voltage threshold (e.g., 23 volts) can be used as a threshold in the short clearing function to avoid the detection of a number of "false positives" that may otherwise occur due to a high inductance level.

In further exemplary embodiments, the controller 123 can control the firing angle of a welding current output inverter to control/prevent the creation of current spikes in clearing shorting events, or other aspects of the welding waveform. As is known, many welding power supplies use an output inverter to output the welding current. In exemplary embodiments the controller 123 can use the detected inductance level to advance or retard the firing angle of the inverter to control/prevent current spikes and reduce spatter, etc. In fact, in exemplary embodiments, the controller 123 can not only improve system performance/short clearing when inductance is high but also when inductance is very low, such as when using very short cables. For example, when there is low inductance, as a short circuit clears the current has a tendency to dip very fast due to the contact break, and in such situations the controller 123 can advance the firing angle of an output inverter to help control the descent of the current, and proceed to the normal welding waveform quicker. Of course other changes to the welding waveform and short clearing functions can be made based on the detected inductance.

Thus, exemplary embodiments of the present invention allow the controller to prevent the welding power supply from implementing a waveform close to its operational limits due to the sensed inductance. That is, the controller 123 can "lock out" certain waveforms, and/or stop an in progress welding operation if the desired welding waveform cannot be implemented with the system inductance to provide an adequate weld or cannot be appropriately modified by the controller 123 to be implemented. This can be indicated via the user interface/display to show a user that the system inductance will not permit welding with the desired waveform. As indicated above, the inductance can be sensed prior to and/or during the welding operation in real-time. In exemplary embodiments, the controller 123 of the system can determine an inductance factor L for a given welding operation which takes into account the measured inductance at the start of a welding operation and the real-time inductance during the welding operation. This factor L can be used by the controller L to modify the welding waveform, short clearing function, and or the wire feed speeding to ensure that the welding operation is optimized for a given set of inductance conditions and as those conditions change during welding.

Figure 6:
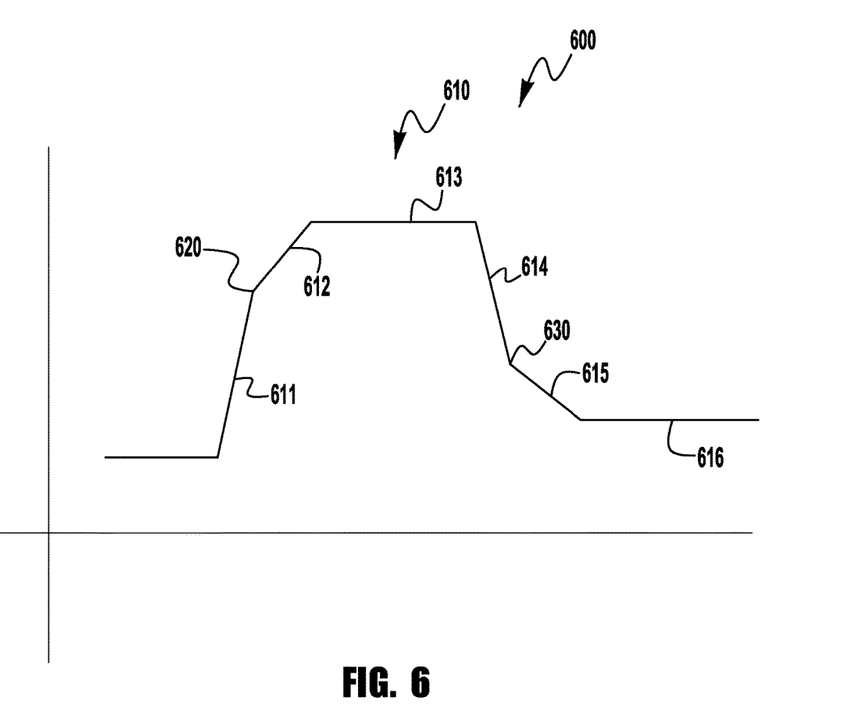
FIG. 6 is a diagrammatical representation of another exemplary current waveform of the present invention.

In other exemplary embodiments, the controller 123 can vary either or both of the ramp up or tail out current based on the determined inductance of the system. This exemplary embodiment is depicted in FIG. 6. As shown in FIG. 6, an exemplary waveform 600 has at least one pulse 610. The pulse has a first ramp up rate 611 and a second ramp up rate 612, which is less than the first ramp up rate 611. In exemplary embodiments the first ramp up rate is a desired current ramp rate to achieve the desired welding performance. The second ramp rate 612 is a slower ramp rate that can be a maximum ramp rate that can be controlled by the welding system with the detected inductance of the system. That is, in exemplary embodiments, the controller 123 uses the sensed inductance or the inductance factor (discussed above) to determine a maximum current ramp rate that can be controlled by the welding system without causing excessive current or voltage spikes. For example, in some embodiments, the system inductance may dictate that a current ramp rate of 350 amps/sec is the largest ramp rate that can be adequately controlled by the system, so that the current can be transition from ramp up to the peak current level 613 without excessive current or voltage spikes. In exemplary embodiments, the controller 123 can use a preprogrammed state table or look up table, or the like to determine an appropriate maximum ramp rate based on the detected inductance. Thus, in exemplary embodiments, the first current rate 611 is maintained to a transition point 620, where the ramp rate is slowed to the second ramp rate 612. The transition point can be determined by the controller 123 based on, at least, the welding waveform type and the sensed inductance. In exemplary embodiments, the transition point is in the range of 60 to 95% of the peak current level 613 of the welding pulse 610. In other exemplary embodiments, the transition point 620 is at a current level that is in the range of 75 to 90% of the peak current 613 level. Further, in some exemplary embodiments, the second ramp rate 612 is in the range of 50 to 90% of the first ramp rate, while in other embodiments, the second ramp rate is in the range of 75 to 90% of the first ramp rate.

In other exemplary embodiments, the controller can determine a scaling factor or waveform modification inductance factor to modify particular aspects of the welding waveform as described herein. In such an embodiment, the scaling factor can be used to modify one or more parameters of the waveform, such as ramp rate, peak current, peak duration, tail out rate, or any combination thereof. That is, for a given detected inductance value the controller can have a scaling factor for each waveform parameter, including ramp rate, peak current, peak current duration, tail out rate, background current level, etc. In some embodiments, this scaling factor can be the same for all of the waveform parameters, but in other embodiments the scaling factor can be different for different waveform parameters. For example, in such embodiments if the scaling factor is determined to be −15% for the ramp rate, for a given inductance level and waveform, the peak current scaling factor can be +5% for that given inductance level and waveform, and the tail out scaling factor can be −20%. Thus, in some embodiments these scaling factors can be used to adjust the parameters of a given waveform for a welding operation, and as the inductance changes these parameters can change. In further exemplary embodiments, in addition to a waveform parameter specific scaling factor, the controller 123 can determine a global inductance scaling factor for the welding operation based on the detected inductance. The global scaling factor would be equally applied to all of the waveform parameters that are to be adjusted. To be clear, it may not be necessary to adjust all waveform parameters for a given welding operation and inductance level, but only some of them, and to the extent those parameters are adjusted this global scaling factor would be used. These factors can be determined by the controller using preset algorithms, look up tables, state tables, etc. Further, in exemplary embodiments, the initial inductance of the system, which is determined before any operation is started, can be determined using the components and circuits described herein, or can be determined using known inductance circuits which are capable of determining system inductance prior to operation. Such inductance determining circuits are known and need not be described in detail herein.

As an example, if a desired ramp rate for a current pulse in a given welding operation is 500 a/ms, the controller 123 can determine for a given welding operation and inductance level that the scaling factor for the ramp rate is −15%. Further, for that given welding operation and inductance level the controller 123 can determine a global inductance factor value of 0.5. In some exemplary embodiments, the global inductance factor value can be in the range of −1 to 1. This global inductance factor value is then used with the parameter specific scaling factor to adjust the waveform parameter. In this example, the scaling factor −15% is reduced by 50% (i.e. 0.5), resulting in a ramp rate reduction of −7.5%, and thus the controller 123 reduces the current ramp rate to approximately 462 amps/ms.

In exemplary embodiments, the parameter specific scaling factors and the global inductance factor can be adjusted linearly based on the detected inductance for a given welding operation. However, in other exemplary embodiments a non-linear adjustment can be made. For example, in some embodiments, at least one, or both, of the factors can increase in relative effect based on detected inductance increases (for example using a parabolic path). In other exemplary embodiments, the factors can be changed via a step-wise relationship. For example, if the inductance is detected to be a first range the scaling factor is X and the global factor is Y, whereas if the inductance is detected to be in a second range the scaling factor is X' and the global factor is Y', etc.

In exemplary embodiments, either one of the global factor or the parameter specific scaling factors can be set after an initial system inductance check, and then the other of the global factor or parameter specific scaling factors are adjusted during the process as the real time inductance is monitored and determined. For example, after an initial system inductance check, before welding begins, the global scale factor is set for the welding process at −0.5. This global factor will be used to adjust the selected waveform. During welding, as the inductance changes, the parameter specific scaling factor(s) are changed to adjust the waveform as described above.

As shown in FIG. 6, in further exemplary embodiments, the current tail out rate can be changed similar to that described above with respect to the ramp up rate. For example, as shown, the current uses a first tail out rate 614 that is as fast as desired to achieve the desired weld performance, for example it can be the designed tail out rate for the given waveform being used. However, as the current is reduced, at a transition point 630 the tail out rate transitions from the first rate 614 to a second tail out rate 615 which is slower than the first tail out rate. Again, in such embodiments, the second tail out rate 615 is determined by the controller 123 based on the detected system inductance, and is a tail out rate that allows the current to be controlled as desired to prevent adverse events, such as the arc being extinguished, etc. Again, the controller 123 can use a pre-programmed look up or state table to determine a maximum controllable tail out rate for a given detected inductance. Thus, in such exemplary embodiments, the tail out current can be controlled into the background current level 616 to prevent the arc from being extinguished and any other adverse current dips, while implementing a waveform that closely matches the desired welding waveform. In exemplary embodiments, the tail out transition point 630 is above the background current level 616 by in the range of 5 to 40% of the background current level. That is, if the desired background current is at 100 amps, the transition point can in the range of 105 to 140 amps. In other embodiments, the tail out transition point is in the range of 10 to 30%. Further, in exemplary embodiments, the second tail out rate 615 is in the range of 5 to 50% slower than the first tail out rate 614, while in other embodiments the second tail out rate 615 is in the range of 10 to 35% slower. Of course, as tail out duration in increased, this could add heat to a given welding operation, such as in pulse welding. Therefore, in some welding operations it may be necessary for the controller 123 to adjust the current level and/or duration of the background to ensure the appropriate amount of heat input is maintained. Thus, again, depending on the welding operation, whether it be STT, short arc, pulse, etc. the modifications to the waveforms can be different for a given detected inductance level to optimize the performance of the welding operation. For example, in some welding operations it may be more important to maintain a specific heat input, while in others droplet transfer may be a priority, and in those situations the waveform adjustment would be different.

As indicated previously, the welding system and controller described herein can detect inductance in real time during a welding operation, and the controller 123 can use the detected inductance to modify a welding waveform and/or change wire feed speed while welding to ensure that an appropriate weld is achieved. For example, in some instances a higher inductance level would cause the welding power supply to work harder, perhaps beyond its operational parameter ranges, to achieve a certain performance. Thus, in such instances, the wire feed speed can also be adjusted to compensate and allow the power supply to operate effectively. This is advantageous over prior systems as inductance can change during a welding operation due to factors such as heat, other welding on the same workpiece, distance from ground points, etc. Further, not only can exemplary systems provide a user warning regarding the operation limits of the welding power supply during welding due to inductance, but can also do so regarding wire feed speed. That is, as indicated above, in addition to modifying the welding waveform during welding, the controller 123 can also change the wire feed speed, from a wire feeder 107, to correspond to the adjustments of the waveform to achieve a desired weld. However, in some instances the adjustments of the wire feed speed (e.g., increasing) may test the functional limitations of the wire feeder. Thus, similar to providing an indication to a user regarding the welding power supply, the controller 123, via a user interface/display, can provide an indication to a user that the wire feed speed is approaching operational limits, or may compromise the weld. In further exemplary embodiments, to the extent a travel robot, or the like, is used it can also be instructed to change its speed along with the change in wire feed speed to maintain a desired deposition rate, etc.

Further, many of the exemplary embodiments discussed above are directed to welding operations where the system inductance may be a limitation on the welding operation. However, in other exemplary embodiments the system/controller 123 can increase the performance of a welding operation based on a low detected inductance. That is, in such embodiments, rather than slowing ramp rates down, the controller can increase ramp rates of a given welding waveform to achieve a more responsive level of performance. Further, in some exemplary embodiments, these operational improvements can be selectable by a user. For example, in some embodiments the user interface 125 can have a "high-performance" switch or setting which, when selected, allows the controller 123 to change the welding waveform to be changed to increase the current ramp and tail out rates to rates that can be achieved with the detected system inductance. Further, the controller 123 can cause the welding waveform to use more optimized short clearing functions to clear shorts faster. However, there may be applications where the user does not want to change the welding waveform, and thus the user can de-select, or not select, the high performance function and thus the controller 123 will simply use the desired waveform, so long as the system inductance will allow the waveform to be implemented.

Exemplary embodiments of the present invention can be used in many different types of welding operations and with different types of welding waveforms, including: STT, pulse, AC and short arc.

In the embodiments described above the welding current and current waveform was discussed as being modified. However, this discussion was intended to be exemplary as embodiments can also be used to adjusted the welding voltage. voltage set point etc. using similar methodologies and processes described above.

In other exemplary embodiments, the weld cables that are coupled to the welding power supply can have an RFID chip or other means of storing identification data that is recognized by the power supply when connected. The stored information can include cable identification, including inductance information for the cables. This information can be recognized and used by the controller 123 to aid in determining the system inductance and the types of welding processes that may be used with the power supply even before a welding process is begun or a pre-welding inductance check is completed. For example, if very long cables are connected the controller 123 will be able to indicate to a user via a user interface that the connected cables will limit the operations available to the user due to the inductance. For example, the user interface can show which waveform types are locked out due to inductance limitations. This can allow a user to know, before any aspect of welding is begun whether the power supply needs to be moved closer to the weld or the current cable length is appropriate. The controller 123 can use a look up table or simpler memory storage to associate an inductance value or rating to a particular set of cables. Further, in some exemplary embodiments, if the cables are recognized as being short or having very low inductance the controller 123 can deactivate the inductance monitoring and/or otherwise allow high performance waveforms to be unlocked. In some embodiments, weld cables with a co-axial structure can be used to minimize the effects of inductance. In some embodiments, the power supply can automatically recognize the connection of co-axial, or other high performance type cables, and with this recognition un-lock high performance welding operations. Again, this recognition can be made via RFID communication or other means.

Further, in some exemplary embodiments, each set of cables that can be used in the welding system can have a separate and distinct identifier which identifies only that cable and the controller 123 can store welding information, including inductance information, related to those distinct cables in a storage. Thus, the controller 123 can retain and use inductance information related to each distinct cable that has been used with it. This information can be used as described above as well as being able to aid in recognizing the deterioration of the cables over a period of time.

Figure 7:
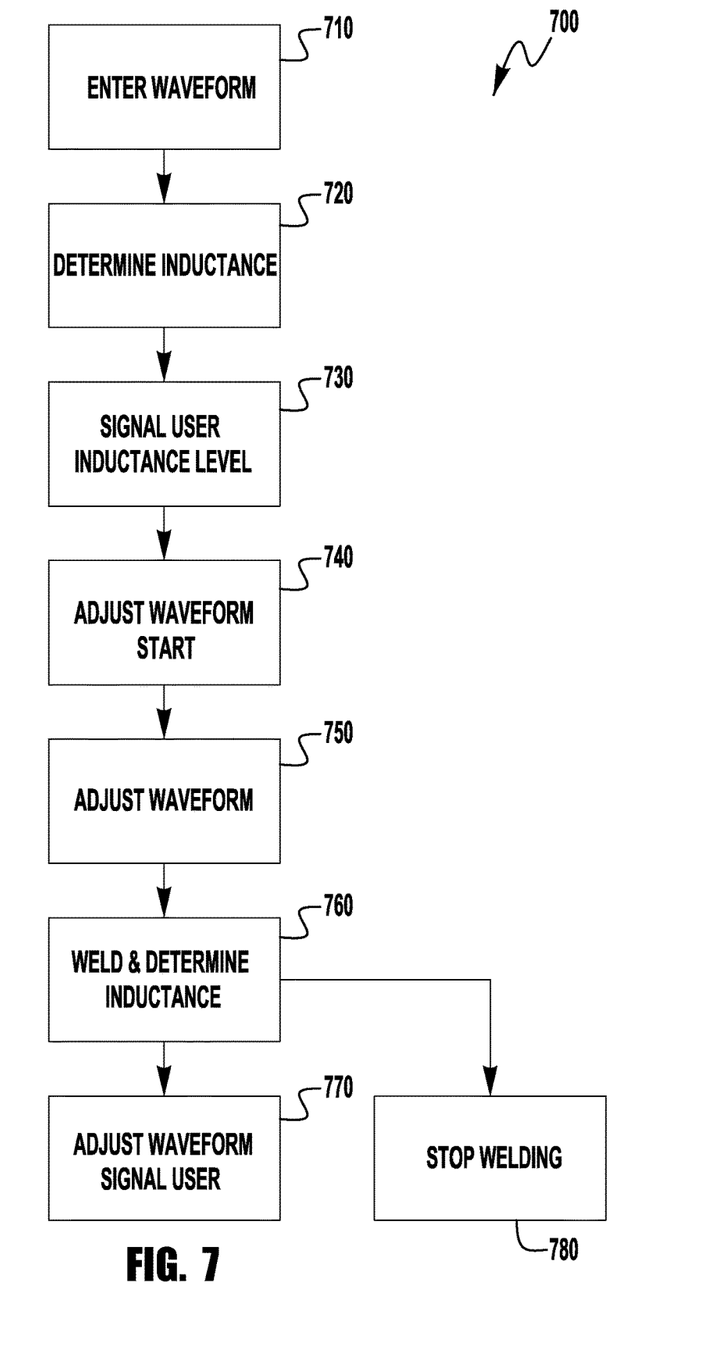
FIG. 7 is a diagrammatical representation of a flow chart representing an exemplary operation.

Turning now to FIG. 7 a representative flow chart 700 is shown which depicts an exemplary usage of the systems described herein. Of course it should be noted that this flow chart is merely exemplary and in other embodiments the sequence of events can be changed and/or other steps and events can be added without departing from the spirit and scope of the present invention. As shown, in a first step a welding waveform 710 can be entered or selected via a user interface. The waveform can be entered manually or selected from a preprogrammed list, etc. With the selected waveform the controller 123 can determine the system inductance 720. This can be done when the power supply is coupled to the work piece and prior to a welding operation being conducted. Further, in some embodiments this can take into account reading information from connected cables as described above. After the initial system inductance is determined the system can signal to the user the inductance level of the system 730 as described herein using the user interface, or any other means to signal to the user. At this stage the controller 123 can also lock out certain waveforms, unlock certain waveforms and/or signal to the user that the desired welding cannot be performed at all due to the system inductance. To the extent that welding can continue, the controller 123 can then determine whether to adjust the arc start portion of the waveform 740 and make the appropriate waveform adjustment, and make whatever adjustments are needed to the waveform itself 750. At these stage, initial adjustments to the wire feed speed and short clearing functions can also be made as needed and/or available (due to low inductance). After the initial adjustments are made the welding process can begin along with the determination of the system inductance in real time during welding 760. This determination can be made as described herein. The inductance can be measured over any duration of the waveform that provides the desired system responsiveness needed to optimize the welding operation. For example, the controller can determine an average inductance of a number "n" of waveform cycles or pulses and use that determined average to control the waveform modifications or system as described herein. In some exemplary embodiments the number of cycles or pulses "n" can be in the range of 5 to 100, while in other embodiments the number can be in the range of 10 to 20. In other embodiments, the average inductance determination can be determined over a predetermined period of time, rather than a counting of cycles. Of course, other embodiments can use other sample methodologies without departing from the spirit or scope of the present invention. As the welding continues the system and controller 123 can continue to adjust the waveform and/or signal the user regarding any changes in inductance 770 as described above. Alternatively, if the detected/determined inductance exceeds a threshold level for a given welding operation, the controller 123 can cause the welding operation to be ceased 780. Of course, other steps can be inserted into the above process and/or the steps indicated above can be re-ordered as needed without departing from embodiments of the invention.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A system having a welding or cutting power supply, the power supply comprising:
   a first output terminal;
   a second output terminal;
   a power component circuit coupled to each of said first and second output terminals which outputs an output signal through at least one of said first and second output terminals;
   a voltage detection circuit which detects a reflected voltage across said first and second output terminals during a welding or cutting operation; and
   a controller circuit which determines an inductance of said system during said welding or cutting operation based on said reflected voltage and changes a parameter of said output signal during said welding or cutting operation based on said determined inductance.

2. The system of claim 1, wherein said parameter is one of a current ramp rate, a peak current level, a peak current duration, a tail out current rate, a background current, and a frequency of said output signal.

3. The system of claim 1, wherein said controller circuit stops said welding or cutting operation based on said inductance.

4. The system of claim 1, wherein said controller circuit changes a plurality of parameters of said output signal based on said inductance, where said plurality of parameters include at least two of a current ramp rate, a peak current level, a peak current duration, a tail out current rate, a background current, and a frequency of said output signal.

5. The system of claim 1, wherein said controller circuit changes a wire feed speed of a consumable based on said inductance.

6. The system of claim 1, further comprising a comparator circuit which compares said reflected voltage to a threshold voltage, wherein said reflected voltage is caused by said inductance when an output current of said power component circuit is changed, and wherein said threshold voltage is an output voltage limit for said power component circuit.

7. The system of claim 1, wherein said controller circuit changes a short circuit clearing function of said output signal based on said inductance.

8. The system of claim 1, wherein said controller circuit changes said output signal such that a current pulse has a first ramp rate, a second ramp rate and a transition point between said first and second ramp rates, where said first ramp rate is different than said second ramp rate, and at least one of said first ramp rate, said second ramp rate, and said transition point is determined based on said inductance.

9. The system of claim 8, where said second ramp rate is in the range of 50 to 90% of said first ramp rate.

10. The system of claim 8, where said second ramp rate is in the range of 75 to 90% of said first ramp rate.

11. The system of claim 1, wherein said controller circuit determines an initial system inductance prior to starting said welding or cutting operation and determines an availability of welding current waveforms based on said initial system inductance.

12. The system of claim 1, wherein said controller circuit determines an initial system inductance prior to starting said welding or cutting operation and determines at least one of a global inductance factor or a parameter specific scaling factor prior to said welding or cutting operation, where said global inductance factor or said parameter specific scaling factor are used to modify said output signal.

13. The system of claim 1, wherein said controller circuit determines each of a global inductance factor and a parameter specific scaling factor, and uses each of said global inductance factor and said parameter specific scaling factor to modify said output signal.

14. A method of welding or cutting, comprising:
providing a welding or cutting power supply;
outputting a welding or cutting signal through at least one of a first output terminal and a second output terminal of said power supply to weld or cut a work piece;
detecting a reflected voltage across said first output terminal and said second output terminal during a welding or cutting operation of said work piece;
determining a system inductance based on said reflected voltage during said welding or cutting operation; and
changing a parameter of said welding or cutting signal, during said welding or cutting operation, based on said determined inductance.

15. The method of claim 14, wherein said parameter is one of a current ramp rate, a peak current level, a peak current duration, a tail out current rate, a background current, and a frequency of said welding or cutting signal.

16. The method of claim 14, further comprising stopping said welding or cutting operation based on said determined inductance.

17. The method of claim 14, further comprising changing a plurality of parameters of said welding or cutting signal based on said inductance, where said plurality of parameters include at least two of a current ramp rate, a peak current level, a peak current duration, a tail out current rate, a background current, and a frequency of said welding or cutting signal.

18. The method of claim 14, further comprising changing a wire feed speed of a consumable based on said determined inductance.

19. The method of claim 14, further comprising comparing said reflected voltage to a threshold voltage, wherein said reflected voltage is caused by said inductance when an output current is changed, and wherein said threshold voltage is an output voltage limit for said power supply.

20. The method of claim 14, further comprising changing a short circuit clearing function of said welding or cutting signal based on said inductance.

21. The method of claim 14, further comprising changing said welding or cutting signal such that a current pulse of said signal has a first ramp rate, a second ramp rate and a transition point between said first and second ramp rates, where said first ramp rate is different than said second ramp rate, and at least one of said first ramp rate, said second ramp rate, and said transition point is determined based on said inductance.

22. The method of claim 21, where said second ramp rate is in the range of 50 to 90% of said first ramp rate.

23. The method of claim 21, where said second ramp rate is in the range of 75 to 90% of said first ramp rate.

24. The method of claim 14, further comprising determining an initial system inductance prior to starting said welding or cutting operation and determining an availability of welding or cutting current waveforms based on said initial system inductance.

25. The method of claim 14, further comprising determining an initial system inductance prior to starting said welding or cutting operation and determining at least one of a global inductance factor or a parameter specific scaling factor prior to said welding or cutting operation, where said global inductance factor or said parameter specific scaling factor are used to modify said welding or cutting signal.

26. The method of claim 14, further comprising determining each of a global inductance factor and a parameter specific scaling factor, and using each of said global inductance factor and said parameter specific scaling factor to modify said welding or cutting signal.

* * * * *